April 29, 1930. H. M. LOEHR 1,756,694
ARM REST FOR AUTOMOBILES
Filed June 28, 1928 2 Sheets-Sheet 1
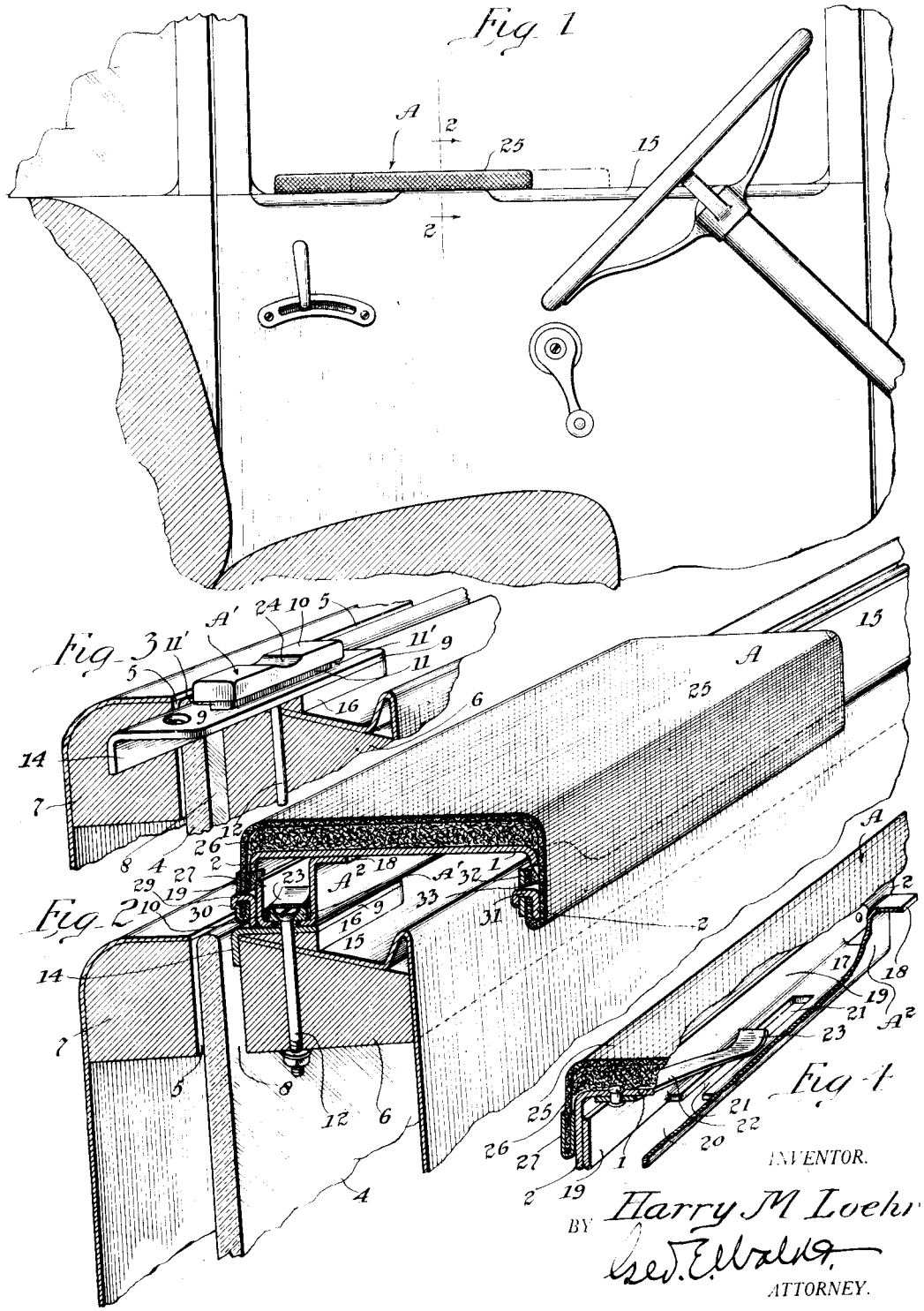
INVENTOR.
Harry M Loehr
BY
Geo. E. Walker
ATTORNEY.

April 29, 1930.  H. M. LOEHR  1,756,694
ARM REST FOR AUTOMOBILES
Filed June 28, 1928   2 Sheets-Sheet 2
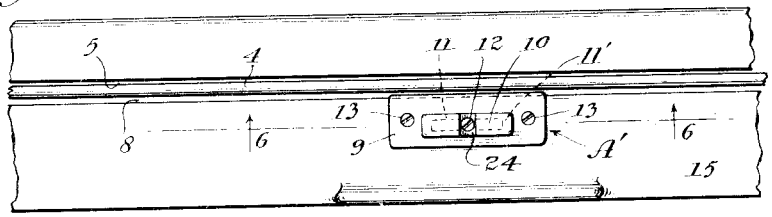
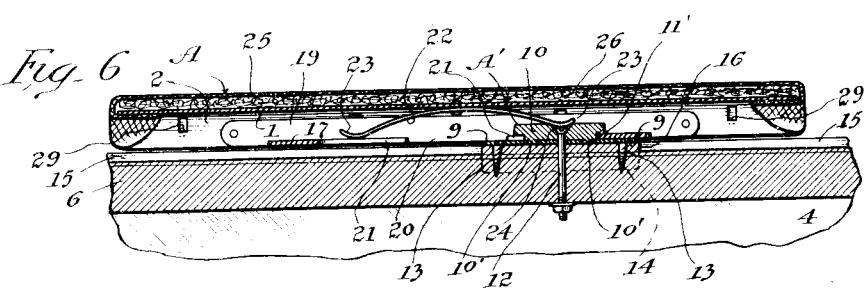
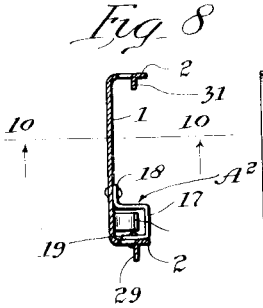
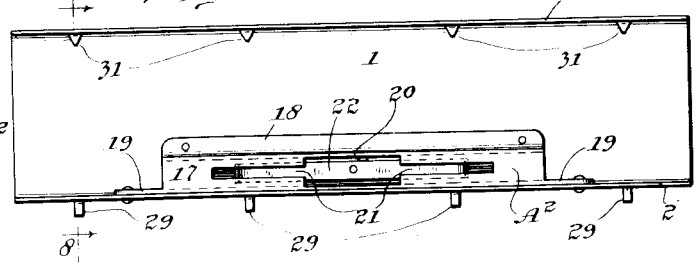
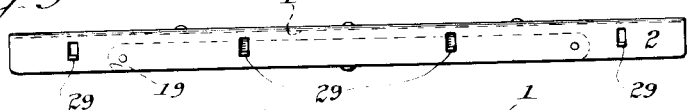
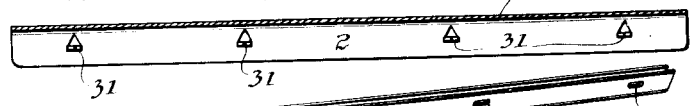
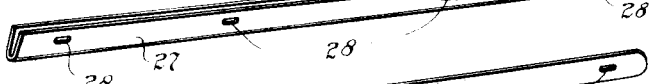
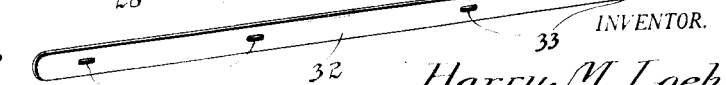
INVENTOR.
BY Harry M. Loehr
ATTORNEY.

Patented Apr. 29, 1930

1,756,694

UNITED STATES PATENT OFFICE

HARRY M. LOEHR, OF LA GRANGE, ILLINOIS, ASSIGNOR OF ONE-FOURTH TO FRANK H. FOSTER AND ONE-FOURTH TO GEORGE H. SHANK, BOTH OF CHICAGO, ILLINOIS

ARM REST FOR AUTOMOBILES

Application filed June 28, 1928. Serial No. 288,904.

This invention relates to armrests and relates particularly to armrests designed and adapted to provide a comfortable support for the arms of drivers of automobiles, particularly the arms used for signalling drivers of other vehicles contemplated changes of travel—either in direction or speed.

Armrests embodying my invention and improvements are particularly designed and adapted for use on cars having closed bodies the doors of which comprise glass window panels in their upper portions adapted to be raised and lowered by means provided for the purpose, and a principal object of the present invention is to provide an arm rest which, besides contributing to the comfort of the drivers and possibly others, will not prevent or interfere with contemplated operation of the windows, which are constructed to raise and lower, and which may quickly and conveniently be installed on practically all makes of closed automobiles bodies without structural changes of any kind therein.

Further objects of the invention are, to provide an armrest for the purpose, specified which may quickly and conveniently be attached and removed; which may be installed in different positions to better adapt it for use by persons of different sizes; and to provide improved means for upholstering said armrest so that it will contribute to the comfort of the driver.

To effect the various objects of the invention, my improved armrest comprises the various features, combinations of features and details of construction hereinafter described and claimed.

In the accompanying drawings in which my invention is fully illustrated,

Figure 1 is a fragmentary side view showing an armrest embodying my invention and improvements installed for use on a door of an automobile;

Figure 2 is an enlarged fragmentary perspective view, partly in section, the plane of the section being substantially on the line 2—2 of Fig. 1;

Figures 3 and 4 are detail perspective views;

Figure 5 is a fragmentary top plan view of a portion of the door frame at the bottom side of the window opening, showing means for attaching my improved armrest thereto;

Figure 6 is an enlarged fragmentary, sectional view substantially on the line 6—6 of Fig. 5;

Figure 7 is a bottom plan view of the body portion of the arm rest, detached and before being upholstered;

Figure 8 is a sectional view taken substantially on the line 8—8 of Fig. 7;

Figure 9 is a side view of the body portion of the armrest from the bottom side of Fig. 8;

Figure 10 is a sectional side view of said body portion substantially on the line 10—10 of Fig. 8;

Figure 11 is a perspective view of a metal binding strip employed in upholstering the armrest proper; and Figure 12 is a perspective view of another sheet metal strip which is similarly employed.

Describing the invention with reference to the drawings, A designates the armrest proper as a whole, A' means, as a whole, on the door frame at the lower side of the window opening for securing said arm rest proper in operative position, and A² means as a whole, on the armrest proper, co-operating with the securing means A'.

In what I now consider to be the preferable embodiment of my invention, the arm rest proper A comprises a body portion 1 preferably made of suitable sheet metal, as sheet aluminum, of substantially channel-shape, being substantially flat with depending marginal flanges 2.

In accordance with usual practice, the window consists of a glass panel 4, the lateral edges of which engage guide grooves, not shown, formed in the adjacent sides of the frame members of the door which form the lateral sides of the window opening, in a usual manner, and which, in operation, plays freely through a usual slot 5 formed by spaced frame members 6 and 7 of the door at the lower side of the window opening.

In accordance with usual practice, the slot 5 is relatively much wider than the thickness of the window panel 4, thus providing a wide clearance between said window panel and door, particularly at its inner side, as shown at 8.

The means A' for securing the arm rest proper A to the door frame, consists of a plate 9 secured to the top side of the inner frame member 6, formed on or secured to which is a T-head 10 provided with under-cut shoulders which, with the plate 9, define grooves 11 on the upper side of said plate and on opposite side of said T-head. For reasons presently explained, also, said T-head is provided with shoulders at its ends, which define transverse grooves 11', similar to the grooves 11, at the ends of the T-head 10. For economy of manufacture, the T-head 10 will preferably be formed separate from the plate 9, and formed on the undersides thereof are short lugs adapted to be inserted through and expanded into countersunk holes formed in the plate 9, as shown at 10'.

Preferably means for securing the plate 9 to the window frame 6 consists of a bolt 12, which extends through holes formed in said plate and frame member 6, threaded to the lower end of which is a nut. If desired, my invention also contemplates securing said plate to the window frame by screws, shown at 13.

As shown also, a flange 14 formed on the plate 9 locks over the outer side of the window frame 6, thus greatly increasing the strength of the connection of the plate 9 thereto and thus of the T-head 10 to said window frame member, to withstand a pull on said plate or T-head, as in case the armrest is used as a grip for closing the door, which is contemplated. The large clearance between the edge of the window frame 6 and the face of the glass panel 4 provides adequate space to receive the flange 14 without fitting.

It is a common practice in body construction to make the top side of the window frame member 6 inwardly and downwardly inclined, as shown at 15 and to provide for installing the plate so that it will extend substantially at right angles to the inner side of the door, an angular filler strip 16 is inserted under said plate. As the angle at the top of said window frame varies in different makes of bodies, said filler strip 16 is preferably made of a material as wood, which may be worked to proper shape with comparative ease.

The means A² on the armrest proper which co-operates with the securing means A' on the door, comprises a hollow member 17 made of suitable sheet metal, preferably sheet aluminum, and which is substantially channel-shaped in cross-section, formed on or secured to the body portion 1 of the armrest proper A, closely adjacent to a marginal flange 2. As shown, said member 17 is secured to the body portion by riveting or otherwise securing a flange 18 formed at one edge thereof, to the underside of said body portion, and by riveting or otherwise securing the opposite edge 19 of said member 17—which is turned up so as to rest in contact with the inner side of the adjacent flange 2—directly to said flange. If desired, however, my invention contemplates equally forming the member 17 as an integral part of the body portion 1 of said armrest and the use of other means than rivets for securing it to said body portion.

Formed in the bottom side of the member 17 is what may be referred to as a key-hole slot, comprising a central relatively wide portion 20 adapted to receive the T-head 10 and relatively narrow end sections 21, said slot, as a whole, being substantially symmetrical on opposite sides of its transverse centre and both the member 17 and said slot being disposed substantially centrally—endwise—of the body portion 1 of the armrest. Also, the grooves 11 are proportioned to slidably receive the edges of the member 17 at the sides of the narrow slots 21 formed in its underside. With the construction described, it is obvious that adjusting the armrest proper A so that different slots 21 engage the T-head 10, the position of the armrest proper A may be adjusted either forward or backward, as may be most comfortable for the driver or if for any other reason desired, within considerable limits.

In accordance with my invention, also, means are provided for locking the armrest proper A yieldingly to the T-head 10. As shown, said means consists of a leaf spring 22 positioned within the hollow member 17 and secured in position by riveting or otherwise securing it to the inner side of the body portion 1 of the armrest proper, the relation being such that said spring will be disposed symmetrically with reference to the slot in the bottom side of said member 17 with which the T-head is adapted to engage. The spring 22 is curved so that, normally, its opposite ends will rest in contact with the bottom side of the hollow member 17 and, adjacent to its ends said spring is reversely curved to form convexly curved portions 23 adapted to interlock with a groove 24 formed transversely in the adjacent side of T-head 10, the relation being such that said convex portion of said spring at opposite ends thereof will engage the groove 24 when the armrest proper A is engaged with the T-head 10 and moved to the limit of its movement in one direction or the other, and the relation is such, also, that when the T-head 10 is in full designed engagement with a slot 21 in the member 17, a groove 11' at the end of said T-head will interlock with the edge of said member 17 at the end of the slot 21 with which said T-head is engaged, thus further strengthening the engagement of the armrest proper with said T-head.

To render the armrest proper A soft so that it will form a comfortable support for the arm of a driver, the body portion 1 thereof is upholstered, said upholstering including a covering 25 of suitable fabric and preferably, also, a suitable padding 26. As regards the general structural features of my improved armrest, the manner of upholstering the body portion thereof is, to a large extent, immaterial, and my invention contemplates any approved or desired form of upholstery applied in any usual or desired manner.

I have, however, devised improved means for securing said upholstery to the body portion 1 of the armrest, which has important advantages as regards simplicity and economy and which I will now describe. To facilitate application of the covering 25 after the padding 26 has been applied, a substantially U-shaped strip 27 of relatively thin sheet metal is adjusted to one lateral edge of the covering and is securely clamped upon the same. Holes 28 having been punched in opposite plies of the strip 27, and holes are engaged with prongs 29 formed on a flange 2 of the body portion 1 of the armrest and which project outwardly therefrom. The holes 28 in the strip 27, having been adjusted over the prongs 29, said prongs are bent downwards as shown at 30, Fig. 2, thus forming hooks which will hold the edge of said covering securely in position. With the prongs or hooks 29 as anchors, the covering 25 is drawn tightly over the padding 26 and its free edge engaged with sharp prongs or tangs 31 formed on the depending flange 2 of the body portion 1 of the armrest other than that on which the prongs 29 are formed and which project at the inner side of said flange, after which a plate 32 provided with holes 33 adapted to receive said prongs or tangs is applied to the exposed side of said covering with the prongs or tangs in engagement with the holes 33, and said prongs or tangs clinched downwardly against the exposed side of the plate 32, which will operate, in an obvious manner, to clamp the edge of the covering firmly to the flange 2 to which it is applied. The ends of the covering are then folded around the ends of the body portion 1 of the armrest and secured to the underside of said body portion in any desired manner, as by glue or other suitable adhesive.

As shown, the ends of the body portion 1 of the armrest between the flanges 2 are open and unobstructed, thus preventing finger grips, beads or other upward projections on the door from interfering with endwise movement of the armrest proper A to adjust it to the T-head 10.

As previously stated the securing means $A^2$ on the armrest proper are symmetrical, thus not only providing for securing the said armrest in different positions forward and back of the T-head anchor 10, but also permitting said armrest to be reversed—when the window is fully lowered—so that its edge remote from the member 17 will project outwardly over the window panel 4—instead of inwardly as shown in the drawings.

I claim:

1. In a device of the class set forth, an anchor adapted for attachment to the window-sill at a point inside the glass, and an arm-rest provided with means at its under-side detachably engaged with said anchor, said means being provided with instrumentalities permitting the arm-rest to move forwardly or backwardly on said anchor, and means for locking the arm-rest in either its forward or rear position.

2. In a device of the class set forth, an anchor adapted for attachment to the window-sill at a point inside the glass, and an arm-rest provided with means at its under-side detachably engaged with said anchor, said means consisting of a casing fastened to the under-side of the arm-rest and provided with a longitudinal slot widened midway its length to permit the anchor to pass therethrough for attachment and detachment, said slot permitting the arm-rest to be slid either forwardly or backwardly on the window-sill to thereby occupy either of two positions, and spring means in the casing for engagement with the anchor to hold the arm-rest in either of its said adjusted positions.

3. In a device of the class set forth, an anchor adapted for attachment to the window-sill at a point inside the glass, and an arm-rest provided with means at its under-side detachably engaged with said anchor, said means being attached to the under-side of the arm-rest at one edge thereof, midway the ends of the arm-rest, said means as well as the anchor being symmetrical so that the arm-rest may be attached to the anchor so as to project inwardly away from the glass or outwardly over the top-edge of the glass when the same is lowered to open position.

4. In a device of the class set forth, an anchor adapted for attachment to the window-sill at a point inside the glass, and an arm-rest provided with means at its under-side detachably engaged with said anchor, said means being attached to the under-side of the arm-rest at one edge thereof, midway the ends of the arm-rest, said means as well as the anchor being symmetrical so that the arm-rest may be attached to the anchor so as to project inwardly away from the glass or outwardly over the top-edge of the glass when the same is lowered to open position, said means being constructed to permit the arm-rest to be moved either forwardly or backwardly on the window-sill in either its outwardly-projecting position or its inwardly-projecting position, to thereby provide four positions for the arm-rest.

5. In a device of the class set forth, an anchor adapted for attachment to the window-sill at a point inside the glass, and an arm-rest provided with means at its underside detachably engaged with said anchor, said means being attached to the under-side of the arm-rest at one edge thereof, midway the ends of the arm-rest, said means as well as the anchor being symmetrical so that the arm-rest may be attached to the anchor so as to project inwardly away from the glass or outwardly over the top-edge of the glass when the same is lowered to open position, said means being constructed to permit the arm-rest to be moved either forwardly or backwardly on the window-sill in either its outwardly-projecting position or its inwardly-projecting position, to thereby provide four positions for the arm-rest, locking means being provided for locking the arm-rest automatically in either of its said four positions.

6. In a device of the class described, the combination with a window-frame which defines an opening, and a window supported in said opening so as to raise and lower to open and close the same, of an arm-rest proper and a supporting member therefor consisting of a plate secured to the window-frame at the lower side of the window-opening and a T-head on said plate having undercut shoulders which with the top surface of the plate defines grooves in the lateral sides of said supporting member, and a member on said arm-rest proper, parts of which detachably interlock with the grooves in the supporting member, said arm-rest proper comprising a metal body portion in channel form, a flexible upholstering covering therefor and metal strips applied to the lateral edges of said covering and secured to the flanges at the lateral edges of said arm-rest proper for securing said covering to said arm-rest proper.

7. In a device of the class described, the combination with a window-frame which defines an opening, and a window supported in said opening so as to raise and lower to open and close the same, of an arm-rest proper and a supporting member therefor consisting of a plate secured to the window-frame at the lower side of the window-opening and a T-head on said plate having undercut shoulders which with the top surface of the plate define grooves in the lateral sides of said supporting member, and a sheet-metal member on said arm-rest proper, parts of which detachably interlock with the grooves in the supporting member and which is secured to the under side of the body portion of the arm-rest proper closely adjacent to a lateral edge thereof, said member being provided with a slot adapted to interlock with the grooves on the supporting member defined by the aforesaid undercut shoulders on the T-head.

In witness that I claim the foregoing as my invention, I affix my signature this 25th day of June, A. D. 1928.

HARRY M. LOEHR.